United States Patent
Lin et al.

(10) Patent No.: US 9,381,717 B2
(45) Date of Patent: Jul. 5, 2016

(54) MANUFACTURING METHOD OF HEAT DISSIPATION STRUCTURE APPLIED TO MOBILE DEVICE

(71) Applicant: Asia Vital Components Co., Ltd., New Taipei (TW)

(72) Inventors: Chih-Yen Lin, New Taipei (TW); Chih-Ming Chen, New Taipei (TW)

(73) Assignee: Asia Vital Components Co., Ltd, New Taipei (TW)

( * ) Notice: Subject to any disclaimer, the term of this patent is extended or adjusted under 35 U.S.C. 154(b) by 159 days.

(21) Appl. No.: 14/161,408

(22) Filed: Jan. 22, 2014

(65) Prior Publication Data

US 2015/0202836 A1    Jul. 23, 2015

(51) Int. Cl.
| | |
|---|---|
| *H01T 14/00* | (2006.01) |
| *H05H 1/48* | (2006.01) |
| *B32B 3/30* | (2006.01) |
| *B32B 15/04* | (2006.01) |
| *B32B 3/26* | (2006.01) |
| *B32B 7/12* | (2006.01) |
| *B32B 15/20* | (2006.01) |

(52) U.S. Cl.
CPC ... *B32B 3/30* (2013.01); *B32B 3/26* (2013.01); *B32B 7/12* (2013.01); *B32B 15/043* (2013.01); *B32B 15/20* (2013.01); *B32B 2255/06* (2013.01); *B32B 2255/20* (2013.01); *B32B 2255/205* (2013.01); *B32B 2305/026* (2013.01); *B32B 2307/302* (2013.01); *B32B 2307/402* (2013.01); *B32B 2457/00* (2013.01); *Y10T 428/12736* (2015.01); *Y10T 428/24612* (2015.01); *Y10T 428/24999* (2015.04); *Y10T 428/249967* (2015.04); *Y10T 428/249969* (2015.04); *Y10T 428/31678* (2015.04)

(58) Field of Classification Search
CPC ...... B23B 15/01; B23B 15/043; B23B 15/20; B23B 3/26; B23B 3/30; H01L 33/641; G06F 1/203
See application file for complete search history.

(56) References Cited

U.S. PATENT DOCUMENTS

| | | | | |
|---|---|---|---|---|
| 5,661,341 | A * | 8/1997 | Neftin | H01L 21/4857 257/692 |
| 7,209,355 | B2 * | 4/2007 | Koga | G06F 1/203 165/80.4 |
| 7,256,353 | B2 | 8/2007 | Osanai et al. | |
| 2012/0164439 | A1 * | 6/2012 | Huang | C23C 14/0635 428/336 |
| 2013/0199771 | A1 * | 8/2013 | Yamaguchi | H01L 33/641 165/185 |

FOREIGN PATENT DOCUMENTS

| | | |
|---|---|---|
| TW | M338542 U | 8/2008 |
| TW | M359191 U | 6/2009 |

(Continued)

*Primary Examiner* — Michael Wieczorek
(74) *Attorney, Agent, or Firm* — C. G. Mersereau; Nikolai & Mersereau, P.A.

(57) ABSTRACT

A manufacturing method of heat dissipation structure applied to mobile device. The heat dissipation structure applied to mobile device includes a heat conduction main body. The heat conduction main body has a heat dissipation side and a heat absorption side. A radiation heat dissipation layer is formed on the heat dissipation side. The heat dissipation structure is disposed in the mobile device to provide a very good heat dissipation effect for the closed space of the mobile device by way of natural convection and radiation. Therefore, the heat dissipation performance of the entire mobile device is greatly enhanced.

10 Claims, 6 Drawing Sheets providing a heat conduction main body and defining a heat dissipation side and a heat absorption side ;    — S1 forming a radiation heat dissipation layer on the heat dissipation side of the heat conduction main body 。   — S2

(56) References Cited

FOREIGN PATENT DOCUMENTS

| TW | M386722 U | 8/2010 |
| TW | M416196 U | 11/2011 |
| TW | M452595 U | 5/2013 |

\* cited by examiner

MANUFACTURING METHOD OF HEAT DISSIPATION STRUCTURE APPLIED TO MOBILE DEVICE

BACKGROUND OF THE INVENTION

1. Field of the Invention

The present invention relates generally to a heat dissipation structure applied to mobile device and a manufacturing method of the heat dissipation structure. The heat dissipation structure is disposed in the closed space of the mobile device to provide a very good heat dissipation effect by way of natural convection and radiation so as to enhance the heat dissipation performance of the mobile device.

2. Description of the Related Art

Currently, there are various mobile devices such as thin-type notebook, tablet and intelligent mobile phone. The internal calculation execution units of the mobile devices have higher and higher operation speed. As a result, the heat generated by these units is greatly increased. In consideration of convenient carriage, these mobile devices have become thinner and thinner. Also, in order to prevent alien article and moisture from entering the interior of the mobile device, the mobile device is generally simply formed with earphone port or connector port without any other opening in communication with ambient air. Therefore, convection can hardly take place between the internal air of the mobile device and the ambient air. Due to the inherent factor of thinned design, the heat generated by the internal calculation execution units and battery of the mobile device can be hardly quickly dissipated outward. Moreover, the internal space of the mobile device is a closed space so that convection is very hard to take place. Under such circumstance, the heat can be hardly dissipated. As a result, the heat will accumulate within the mobile device. This will seriously deteriorate the working efficiency of the mobile device or even lead to thermal crash of the mobile device.

Furthermore, in order to solve the above problems, some manufacturers arrange passive heat dissipation elements inside the mobile device, such as heat plate, vapor chamber and heat sink to dissipate the heat. However, still due to the thinned design of the mobile device, the internal space of the mobile device is so narrow that the heat dissipation elements arranged in the space are limited to have an ultrathin thickness for arrangement in the narrow internal space. Due to the limitation of size and thickness, the internal capillary structures and vapor passages of the heat plate and vapor chamber must be very thin. Under such circumstance, as a whole, the heat conduction efficiency of the heat plate and vapor chamber is inevitably detracted. As a result, the heat dissipation performance can be hardly enhanced. In case that the power of the internal calculation unit of the mobile device is too high, the conventional heat plate and vapor chamber will be unable to effectively dissipate the heat generated by the calculation unit. Therefore, it has become a critical issue in this field how to arrange effective heat dissipation elements in the narrow closed space of the mobile device to effectively dissipate the heat.

SUMMARY OF THE INVENTION

It is therefore a primary object of the present invention to provide a heat dissipation structure applied to mobile device.

It is a further object of the present invention to provide a manufacturing method of a heat dissipation structure applied to mobile device.

To achieve the above and other objects, the heat dissipation structure applied to mobile device of the present invention includes a heat conduction main body. The heat conduction main body has a heat dissipation side and a heat absorption side. A radiation heat dissipation layer is formed on the heat dissipation side.

The manufacturing method of the heat dissipation structure applied to mobile device of the present invention includes steps of:

providing a heat conduction main body and defining a heat dissipation side and a heat absorption side; and forming a radiation heat dissipation layer on the heat dissipation side of the heat conduction main body.

The radiation heat dissipation layer is disposed on the heat dissipation side of the heat conduction main body. The heat dissipation structure is disposed in the closed space of the mobile device to provide a very good heat dissipation effect by way of natural convection and radiation. Therefore, the heat dissipation performance of the entire mobile device is greatly enhanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
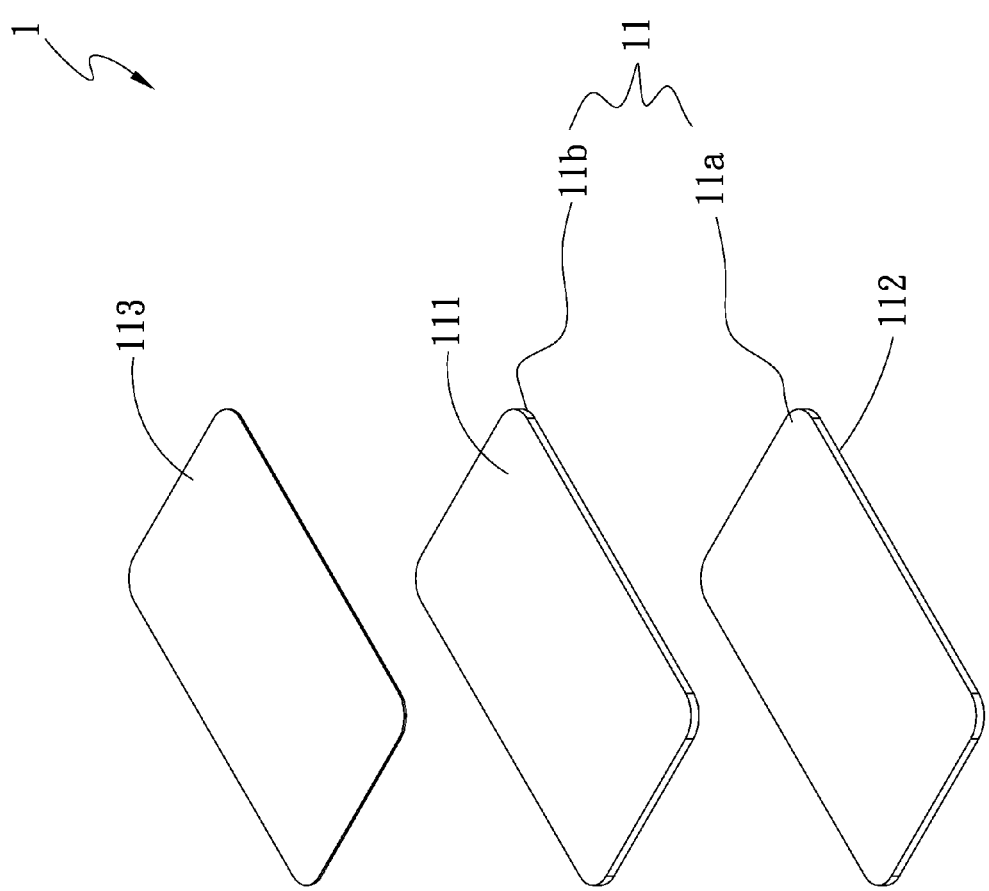
FIG. 1 is a perspective exploded view of a first embodiment of the heat dissipation structure applied to mobile device of the present invention.
Figure 2:
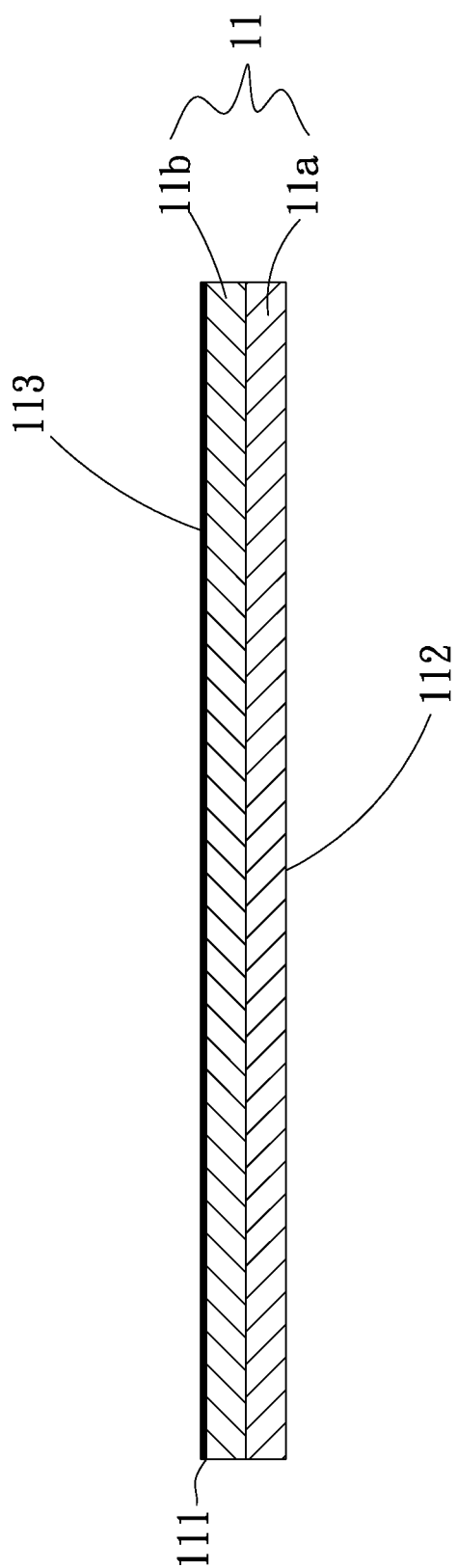
FIG. 2 is a sectional assembled view of the first embodiment of the heat dissipation structure applied to mobile device of the present invention.

Please refer to FIGS. 1 and 2. FIG. 1 is a perspective exploded view of a first embodiment of the heat dissipation structure applied to mobile device of the present invention. FIG. 2 is a sectional assembled view of the first embodiment of the heat dissipation structure applied to mobile device of the present invention. According to the first embodiment, the heat dissipation structure 1 applied to mobile device of the present invention includes a heat conduction main body 11.

The heat conduction main body 11 can be made of a metal material or an alloy or a composition or complex material thereof with high heat conduction efficiency. The heat conduction main body 11 has a heat dissipation side 111 and a heat absorption side 112. A radiation heat dissipation layer 113 can be directly formed or coated on the heat dissipation side 111. In this embodiment, the heat conduction main body 11 is selectively composed of a copper board body 11a and an aluminum board body 11b, which overlap each other. The heat absorption side 112 is disposed on one face of the copper board body 11a, which face is opposite to the attaching faces of the copper board body 11a and the aluminum board body 11b. The heat dissipation side 111 is disposed on one face of the aluminum board body 11b, which face is opposite to the attaching faces of the aluminum board body 11b and the copper board body 11a. The copper board body and the aluminum board body are attached to and assembled with each other by means of adhesive bonding or medium-free diffusion bonding.

The radiation heat dissipation layer 113 is selected from a group consisting of porous structure, nanostructure body, high-radiation ceramic structure, high-hardness ceramic structure, porous ceramic structure and porous graphite structure. The radiation heat dissipation layer 113 is formed on the heat dissipation side 111 of the heat conduction main body 11 by a means selected from a group consisting of evaporation deposition, sputtering deposition, electroplating, print coating, baking varnishing, nano-paint spraying and surface anodic oxidation. In this embodiment, the radiation heat dissipation layer 113 is a nanostructure body. The nanostructure body on the heat dissipation side 111 of the heat conduction main body 11 is ceramicized by a means selected from a group consisting of Micro Arc Oxidation (MAO), Plasma Electrolytic Oxidation (PEO), Anodic Spark Deposition (ASD) and Anodic Oxidation by Spark Deposition (ANOF) (to harden the surface and enhance the radiation effect). Moreover, in order to achieve better radiation efficiency, the radiation heat dissipation layer 113 has black color, sub-black color or dark color. In this case, the heat radiation dissipation effect of the radiation heat dissipation layer 113 is further greatly enhanced. In this embodiment, the color of the radiation heat dissipation layer 113 is, but not limited to, black for illustration purposes. Thanks to the quick heat conduction and dissipation property of ceramic and graphite, the natural heat radiation dissipation performance is further promoted.

Figure 3:
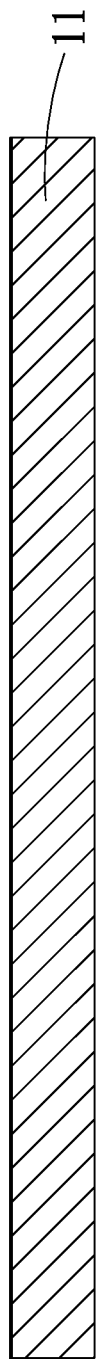
FIG. 3 is a sectional assembled view of a second embodiment of the heat dissipation structure applied to mobile device of the present invention.

Please now refer to FIG. 3, which is a sectional assembled view of a second embodiment of the heat dissipation structure applied to mobile device of the present invention. The second embodiment is partially identical to the first embodiment in structure and thus will not be repeatedly described hereinafter. The second embodiment is different from the first embodiment in that the heat conduction main body 11 is made of a complex material of copper and aluminum. The complex material of copper and aluminum is able to increase the structural strength of the heat conduction main body 11 and enhance the heat conduction performance of the heat conduction main body 11.

Figure 4:
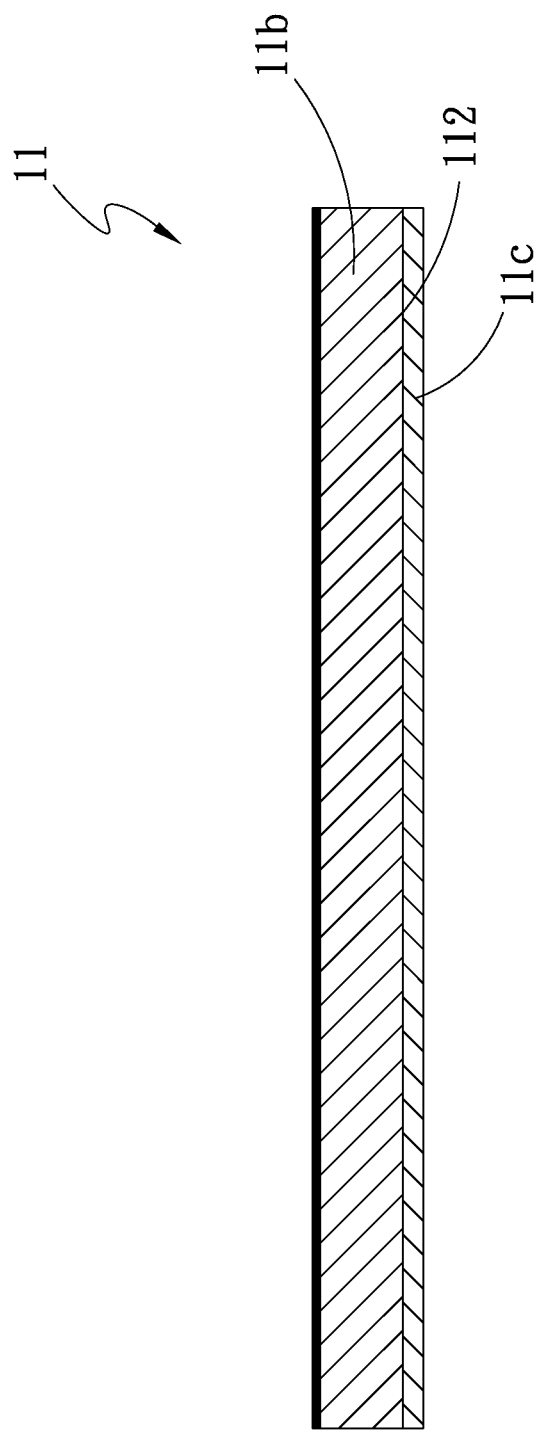
FIG. 4 is a sectional assembled view of a third embodiment of the heat dissipation structure applied to mobile device of the present invention.

Please now refer to FIG. 4, which is a sectional assembled view of a third embodiment of the heat dissipation structure applied to mobile device of the present invention. The third embodiment is partially identical to the first embodiment in structure and thus will not be repeatedly described hereinafter. The third embodiment is different from the first embodiment in that the heat conduction main body 11 is a board body 11b made of aluminum or ceramic material and a copper coating 11c coated on the heat absorption side 112. Accordingly, the aluminum board body 11b serves as a substrate structure body of the heat conduction main body 11 to advantageously provide better structural strength and lower the manufacturing cost. The copper coating 11c is coated on the heat absorption side 112 to enhance the heat absorption and heat conduction efficiency of the heat conduction main body 11.

Figure 5:
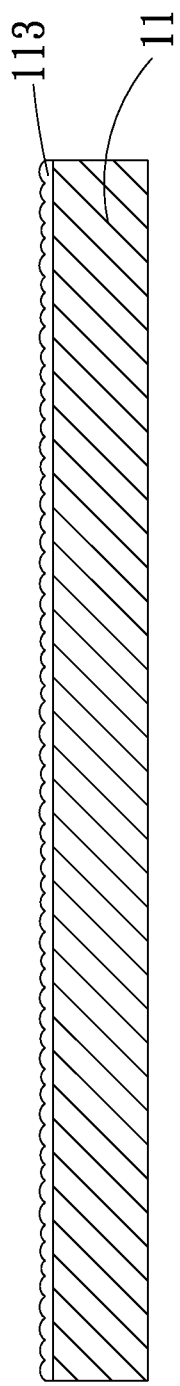
FIG. 5 is a sectional assembled view of a fourth embodiment of the heat dissipation structure applied to mobile device of the present invention.

Please now refer to FIG. 5, which is a sectional assembled view of a fourth embodiment of the heat dissipation structure applied to mobile device of the present invention. The fourth embodiment is partially identical to the first embodiment in structure and thus will not be repeatedly described hereinafter. The fourth embodiment is different from the first embodiment in that the radiation heat dissipation layer 113 is formed with recessed/raised structures by means of shot peening for increasing the heat dissipation contact area. In addition, a black color is attached to the surface of the radiation heat dissipation layer 113 by means of painting or coating.

The heat dissipation structure applied to mobile device of the present invention is able to effectively dissipate the heat generated in the internal closed space of the mobile device and solve the problem of heat accumulation of the mobile device.

In the heat dissipation structure applied to mobile device of the present invention, the copper coating is partially attached to or coated on the heat absorption side so as to enhance the heat absorption efficiency of the heat conduction main body. The black radiating heat dissipation layer is disposed on the heat dissipation side to increase the heat dissipation contact area and promote the heat radiation dissipation efficiency.

Figure 6:
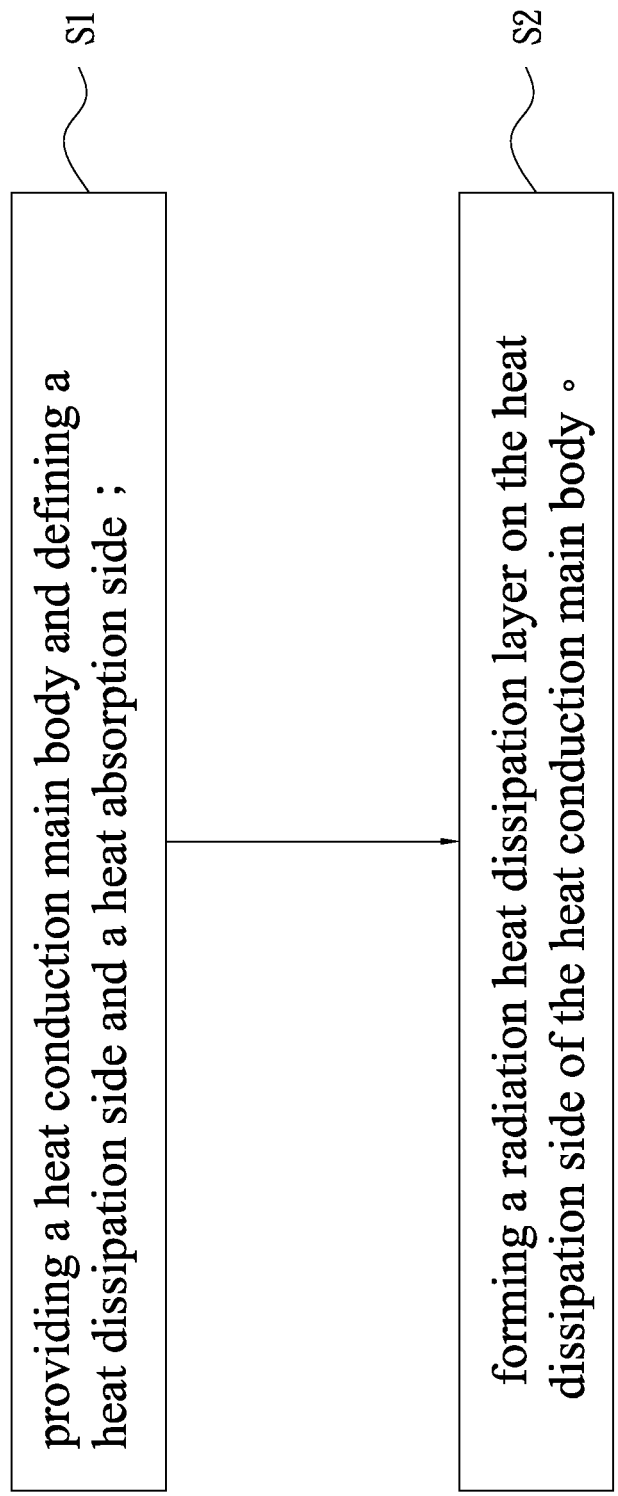
FIG. 6 is a flow chart of a preferred embodiment of the manufacturing method of the heat dissipation structure of the present invention.

Please now refer to FIG. 6, which is a flow chart of a preferred embodiment of the manufacturing method of the heat dissipation structure of the present invention. Also referring to FIGS. 1 to 5, the manufacturing method of the heat dissipation structure of the present invention includes steps of:

S1. providing a heat conduction main body and defining a heat dissipation side and a heat absorption side, a heat conduction main body 11 being provided and defined with a heat dissipation side 111 on one side and a heat absorption side 112 on the other side, the heat conduction main body 11 being a board body 11b made of aluminum or ceramic material, a copper coating 11c being coated on the heat absorption side of the main body (as shown in FIG. 4), alternatively, the heat conduction main body 11 being composed of a copper board body 11a and an aluminum board body 11b, which overlap each other, the heat absorption side 112 being disposed on one face of the copper board body 11a, which face is opposite to an attaching face of the copper board body 11a in attachment to the aluminum board body 11b, the heat dissipation side 111 being disposed on one face of the aluminum board body 11b, which face is opposite to an attaching face of the aluminum board body 11b in attachment to the copper board body 11a, the copper board body 11a and the aluminum board body 11b being attached to each other by means of adhesive bonding or medium-free diffusion bonding (as shown in FIGS. 1 and 2), still alternatively, the heat conduction main body 11 being made of a complex material of copper and aluminum (as shown in FIG. 3), the heat conduction main body 11 in this embodiment having a structural form as the first to fourth embodiments of the heat dissipation structure applied to mobile device of the present invention as shown in FIGS. 1 to 5; and S2. forming a radiation heat dissipation layer on the heat dissipation side of the heat conduction main body, a radiation heat dissipation layer 113 being formed on the heat dissipation side 111 of the heat conduction main body 11, the radiation heat dissipation layer 113 being selected from a group consisting of porous structure, nanostructure body, porous ceramic structure and porous graphite structure, the radiation heat dissipation layer 113 having black color, sub-black color or dark color.

The radiation heat dissipation layer 113 of porous structure on the heat dissipation side 111 of the heat conduction main body 11 is ceramicized by a means selected from a group consisting of Micro Arc Oxidation (MAO), Plasma Electrolytic Oxidation (PEO), Anodic Spark Deposition (ASD) and Anodic Oxidation by Spark Deposition (ANOF). In this embodiment, the radiation heat dissipation layer 113 is formed on the heat dissipation side 111 of the heat conduction main body 11 by means of Micro Arc Oxidation (MAO).

Alternatively, the surface of the radiation heat dissipation layer 113 is formed with recessed/raised structures by means of shot peening (as shown in FIG. 5).

The present invention mainly dissipates the heat by way of heat radiation. Heat conduction and convection both necessitate a medium for transferring the heat, while heat radiation can directly transfer the heat without any medium. Accordingly, even in a tiny closed space, the heat can be still transferred to the case of the mobile device for heat exchange between the case and the exterior.

Heat radiation means that the heat is transferred in the form of electromagnetic wave at light speed without any medium. An object can continuously radiate heat and absorb heat radiation from outer side. The ability of radiating heat of an object is related to the surface temperature, color and roughness of the object.

According to the relevant application principles, the present invention employs the radiation heat dissipation layer to increase the surface heat dissipation area and promote the natural heat dissipation efficiency. The surface heat radiation intensity of the object is not only related to the temperature, but also related to the properties of the surface. For example, an object with black surface is easier to absorb heat radiation and also easier to radiate heat. Accordingly, the radiation heat dissipation layer of the present invention has black color or the surface of the radiation heat dissipation layer has black color to further enhance the heat radiation efficiency.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of heat dissipation structure applied to mobile device, comprising steps of:
    providing a heat conduction main body and defining a heat dissipation side and a heat absorption side; wherein the heat conduction main body is composed of a copper board body and an aluminum board body, which abut each other to form a layered surface, the heat absorption side being disposed on one face of the copper board body, which face is opposite to an attaching face of the copper board body in attachment to the aluminum board body, the heat dissipation side being disposed on one face of the aluminum board body, which face is opposite to an attaching face of the aluminum board body in attachment to the copper board body; and
    forming a radiation heat dissipation layer on the heat dissipation side of the heat conduction main body; wherein the radiation heat dissipation layer is formed with recessed/raised structure by means of shot peening.

2. The manufacturing method of the heat dissipation structure applied to mobile device as claimed in claim 1, wherein the radiation heat dissipation layer is selected from a group consisting of porous structure and nanostructure body.

3. The manufacturing method of the heat dissipation structure applied to mobile device as claimed in claim 2, wherein the radiation heat dissipation layer has a black color.

4. The manufacturing method of the heat dissipation structure applied to mobile device as claimed in claim 1, wherein the radiation heat dissipation layer is a porous structure formed on the heat dissipation side of the heat conduction main body by a means selected from a group consisting of Micro Arc Oxidation (MAO), Plasma Electrolytic Oxidation (PEO), Anodic Spark Deposition (ASD) and Anodic Oxidation by Spark Deposition (ANOF).

5. The manufacturing method of the heat dissipation structure applied to mobile device as claimed in claim 4, wherein the radiation heat dissipation layer has a black color.

6. The manufacturing method of the heat dissipation structure applied to mobile device as claimed in claim 1, wherein the radiation heat dissipation layer is selected from a group consisting of porous ceramic structure and porous graphite structure.

7. The manufacturing method of the heat dissipation structure applied to mobile device as claimed in claim 6, wherein the radiation heat dissipation layer has a black color.

8. The manufacturing method of the heat dissipation structure applied to mobile device as claimed in claim 1, wherein the copper board body and the aluminum board body are attached to each other by means of adhesive bonding or medium-free diffusion bonding.

9. The manufacturing method of the heat dissipation structure applied to mobile device as claimed in claim 8, wherein the radiation heat dissipation layer has a black color.

10. The manufacturing method of the heat dissipation structure applied to mobile device as claimed in claim 1, wherein the radiation heat dissipation layer has a black color.

* * * * *